United States Patent
Kim et al.

(10) Patent No.: US 10,511,028 B2
(45) Date of Patent: Dec. 17, 2019

(54) ELECTROLYTE MEMBRANE, FUEL CELL INCLUDING SAME, BATTERY MODULE INCLUDING FUEL CELL, AND METHOD FOR MANUFACTURING ELECTROLYTE MEMBRANE

(71) Applicant: LG CHEM, LTD., Seoul (KR)

(72) Inventors: Jong Woo Kim, Daejeon (KR);
Changseok Ryoo, Daejeon (KR);
Gyunjoong Kim, Daejeon (KR);
Kwangwook Choi, Daejeon (KR);
Sanghyeok Im, Daejeon (KR);
Yeonhyuk Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 15/515,289

(22) PCT Filed: Sep. 25, 2015

(86) PCT No.: PCT/KR2015/010252
§ 371 (c)(1),
(2) Date: Mar. 29, 2017

(87) PCT Pub. No.: WO2016/052966
PCT Pub. Date: Apr. 7, 2016

(65) Prior Publication Data
US 2017/0222229 A1    Aug. 3, 2017

(30) Foreign Application Priority Data
Sep. 30, 2014    (KR) .................. 10-2014-0132098

(51) Int. Cl.
*B01D 67/00*    (2006.01)
*B01J 23/08*    (2006.01)
*C01F 17/00*    (2006.01)
*H01M 4/88*    (2006.01)
*H01M 8/12*    (2016.01)
*H01M 10/0562*    (2010.01)
(Continued)

(52) U.S. Cl.
CPC ........ *H01M 4/881* (2013.01); *B01D 67/0039* (2013.01); *B01J 23/08* (2013.01);
(Continued)

(58) Field of Classification Search
CPC .. H01M 4/881; H01M 2/1646; H01M 8/1246; H01M 2008/1293; H01M 4/86;
(Continued)

(56) References Cited

U.S. PATENT DOCUMENTS

| | | |
|---|---|---|
| 6,004,688 A | 12/1999 | Goodenough et al. |
| 2005/0031518 A1 | 2/2005 | Munakata et al. |

(Continued)

FOREIGN PATENT DOCUMENTS

| | | |
|---|---|---|
| EP | 2 413 408 A1 | 2/2012 |
| EP | 2 698 852 A1 | 2/2014 |

(Continued)

OTHER PUBLICATIONS

Djurado et al. J. Eur. Cer. Soc. 18 (1998) 1397-1404 (Year: 1998).*
(Continued)

*Primary Examiner* — Lisa S Park
(74) *Attorney, Agent, or Firm* — Birch, Stewart, Kolasch & Birch, LLP

(57) ABSTRACT

The present specification relates to an electrolyte membrane, a fuel cell including the same, a battery module including the fuel cell, and a method for manufacturing the electrolyte membrane.

10 Claims, 4 Drawing Sheets

(51) Int. Cl.
  *H01M 8/02*        (2016.01)
  *B01J 23/10*       (2006.01)
  *H01M 4/86*        (2006.01)
  *H01M 8/04119*     (2016.01)
  *H01M 8/10*        (2016.01)
  *C01G 15/00*       (2006.01)
  *H01M 2/16*        (2006.01)
  *H01M 8/1246*      (2016.01)
  *H01M 8/124*       (2016.01)

(52) U.S. Cl.
  CPC ........... *B01J 23/10* (2013.01); *C01F 17/0043* (2013.01); *C01G 15/006* (2013.01); *H01M 2/1646* (2013.01); *H01M 4/86* (2013.01); *H01M 8/02* (2013.01); *H01M 8/04149* (2013.01); *H01M 8/10* (2013.01); *H01M 8/12* (2013.01); *H01M 8/1246* (2013.01); *H01M 10/0562* (2013.01); *C01B 2203/0405* (2013.01); *C01P 2002/34* (2013.01); *C01P 2002/72* (2013.01); *C01P 2006/40* (2013.01); *H01M 2008/1293* (2013.01); *H01M 2300/0074* (2013.01); *H01M 2300/0091* (2013.01); *Y02E 60/525* (2013.01); *Y02P 70/56* (2015.11)

(58) Field of Classification Search
  CPC ...... H01M 8/10; H01M 8/04149; H01M 8/02; H01M 10/0562; H01M 8/12; C01F 17/0043; B01J 23/10; B01J 23/08; C01G 15/006; B01D 67/0039; C01B 2203/0405; C01P 2002/72; C01P 2006/40; Y02P 70/56; Y02E 60/523
  See application file for complete search history.

(56) References Cited

U.S. PATENT DOCUMENTS

| 2008/0220327 | A1  | 9/2008 | Kim |   |
|---|---|---|---|---|
| 2010/0028733 | A1* | 2/2010 | Sin Xicola | .......... H01M 8/1246 |
|  |  |  |  | 429/442 |

FOREIGN PATENT DOCUMENTS

| KR | 10-2004-0066118 A | 7/2004 |
| KR | 10-2005-0021027 A | 3/2005 |
| KR | 10-0833770 A | 5/2008 |
| WO | WO 2005/117191 A1 | 12/2005 |

OTHER PUBLICATIONS

Huang et al., "Wet Chemical Synthesis of Sr- and Mg-Doped $LaGaO_3$, a Perovskite-Type Oxide-Ion Conductor", Journal of Solid State Chemistry, vol. 136, Article No. SC977706, 1998, pp. 274-283.

International Search Report (PCT/ISA/210) issued in PCT/KR2015/010252, dated Dec. 8, 2015.

Schulz et al., "Preparation and characterisation of $La_{1-x}Sr_xGa_{1-y}Mg_yO_{3-(x+y)/2}$ for the investigation of cation diffusion processes", Solid State Ionics, vol. 135, 2000, pp. 549-555.

Thangadurai et al., "Recent progress in solid oxide and lithium ion conducting electrolytes research", Ionics, vol. 12, 2006, pp. 81-92.

European Search Report for Appl. No. 15846345.5 dated Feb. 27, 2018.

Liu, B., et al, "$La0.9Sr0.1Ga0.8Mg0.2O3$-δ sintered by spark plasma sintering (SPS) for intermediate temperature SOFC electrolyte," Journal of Alloys and Compounds, Jun. 30, 2008, vol. 458, No. 1-2, pp. 383-389.

Subasri, R. et al, "Microwave assisted synthesis and sintering of $La0.8Sr0.2Ga0.83Mg0.17O2.815$," Materials Letters, Mar. 1, 2003, vol. 57, No. 12, pp. 1792-1797.

Chinese Office Action for Appl. No. 201580052573.1 dated Oct. 21, 2019 (with English translation).

Inoishi et al., High capacity of an Fe-air rechargeable battery using $LaGaO3$-based oxide ion conductor as an electrolyte, Phy, Chem. Chem. Phys, 2012, vol. 14, pp. 12818-12822.

Seong et al., Synthesis and Characterization of LSGM Solid Electrolyte for Solid Oxide Fuel Cell, Journal of the Korean Ceramic Society, 2007, vol. 44, No. 12, pp. 696-702.

* cited by examiner

[Figure 1]
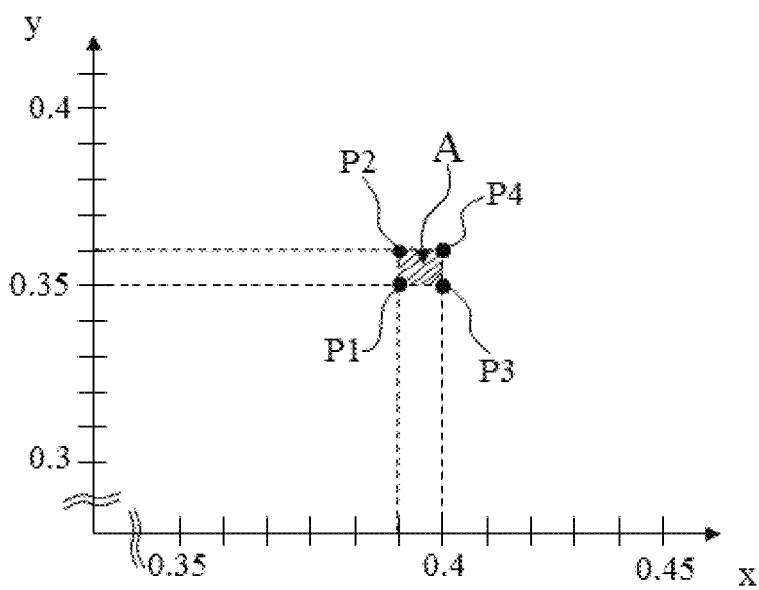
[Figure 2]
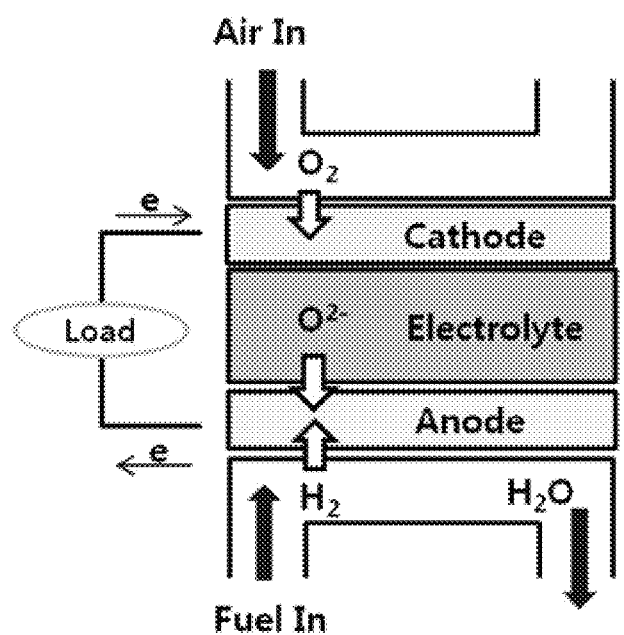

[Figure 3]
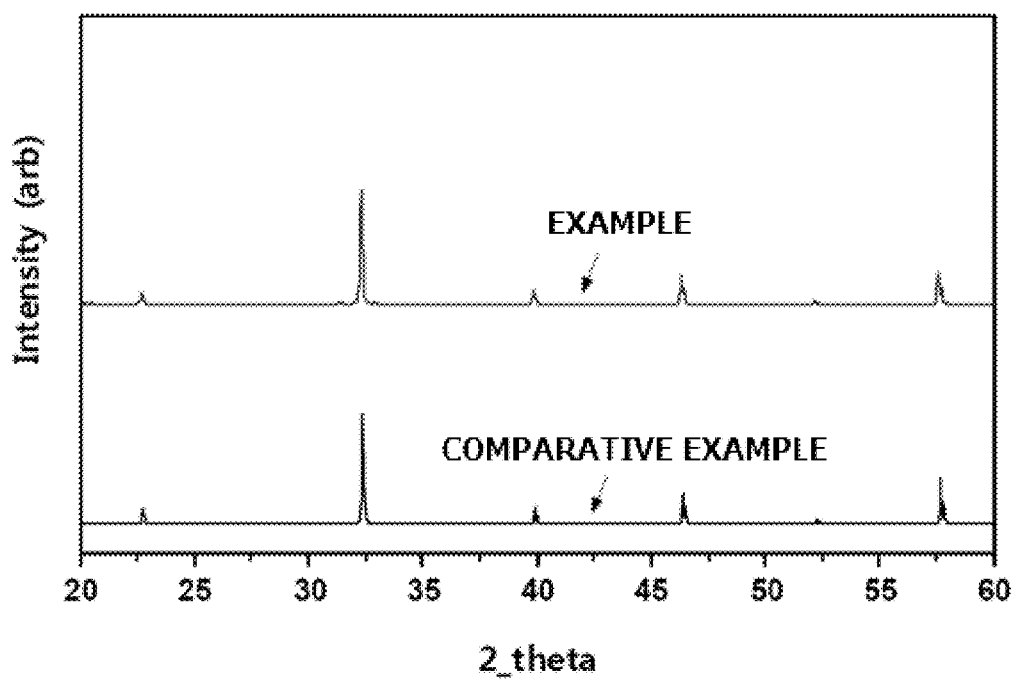

[Figure 4]
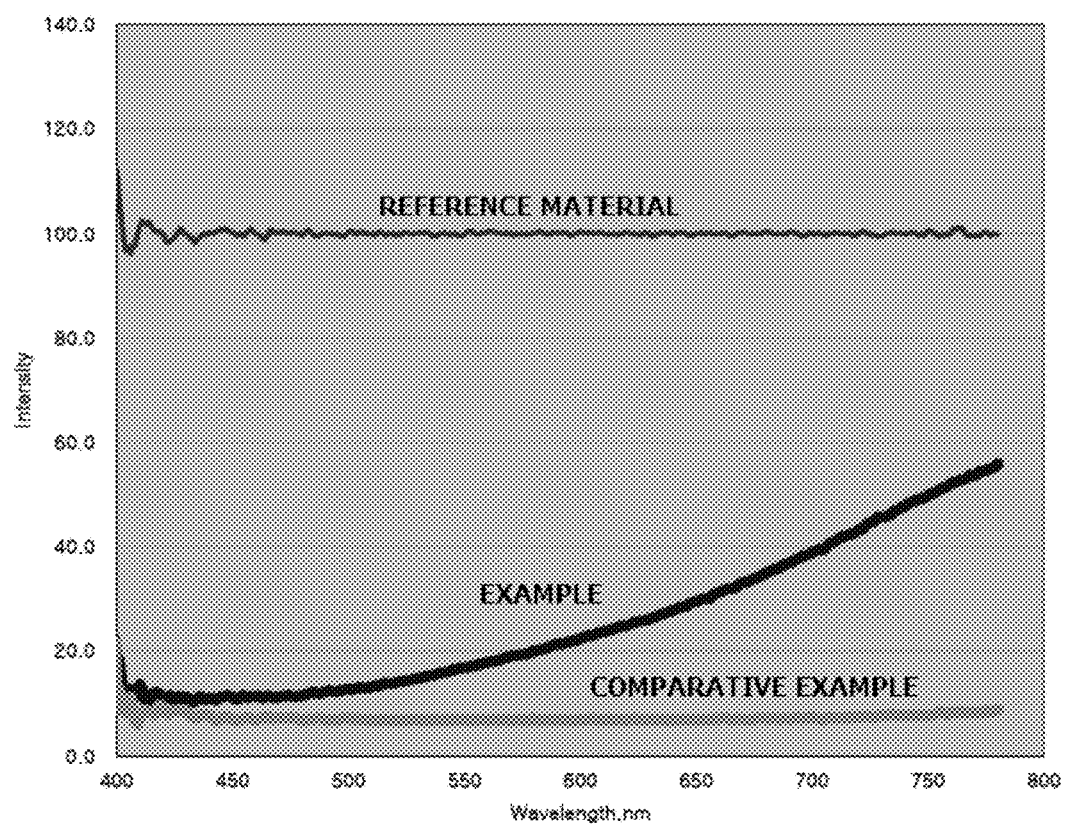

[Figure 5]
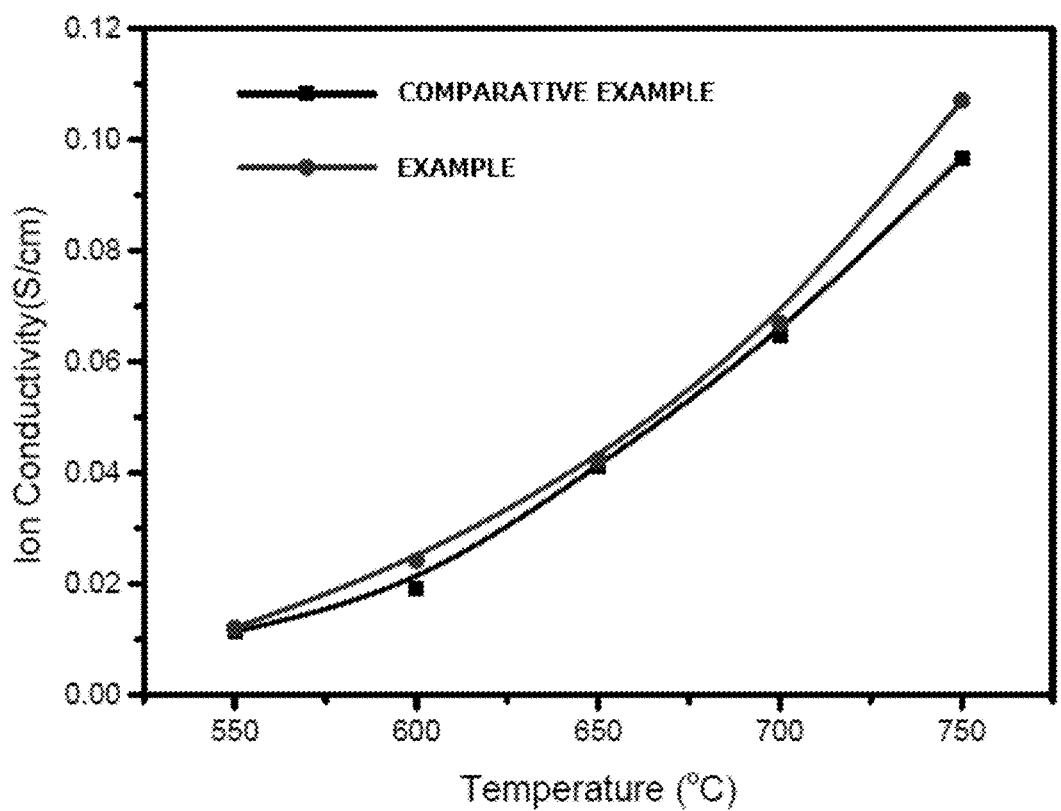

ELECTROLYTE MEMBRANE, FUEL CELL INCLUDING SAME, BATTERY MODULE INCLUDING FUEL CELL, AND METHOD FOR MANUFACTURING ELECTROLYTE MEMBRANE

TECHNICAL FIELD

The present invention claims priority to and the benefit of Korean Patent Application No. 10-2014-0132098 filed in the Korean Intellectual Property Office on Sep. 30, 2014, the entire contents of which are incorporated herein by reference.

The present specification relates to an electrolyte membrane, a fuel cell including the same, a battery module including the fuel cell, and a method for manufacturing the electrolyte membrane.

BACKGROUND ART

Fuel cells can be classified into polymer electrolyte membrane fuel cells (PEMFCs), direct methanol fuel cells (DMFCs), alkaline fuel cells (AFCs), phosphoric acid fuel cells (PAFCs), molten carbonate fuel cells (MCFCs), solid oxide fuel cells (SOFCs), and the like depending on the types of electrolyte used and fuel used Further, the working temperature of fuel cells and constituent part materials thereof vary depending on the type of electrolyte used.

Among them, a solid oxide fuel cell is a type of fuel cell which is an energy conversion device to directly convert chemical energy having hydrogen and oxygen into electric energy by electrochemical reactions, and has received attention as a next-generation energy conversion device due to many advantages in terms of high conversion efficiency and eco-friendliness.

In this case, studies for developing a thin and dense electrolyte membrane for a solid oxide fuel cell are underway.

DETAILED DESCRIPTION OF THE INVENTION

Technical Problem

The present specification has been made in an effort to provide an electrolyte membrane, a fuel cell including the same, a battery module including the fuel cell, and a method for manufacturing the electrolyte membrane.

Technical Solution

The present specification provides an electrolyte membrane which includes a lanthanum-gallium-based composite metal oxide, and has a color region of $0.39 \leq x \leq 0.40$ and $0.35 \leq y \leq 0.36$ based on the CIE (Commission Internationale de l'Eclairage) x, y chromaticity distribution table.

Further, the present specification provides a fuel cell including an air electrode, a fuel electrode, and the electrolyte membrane disposed between the air electrode and the fuel electrode.

In addition, the present specification provides a battery module including the fuel cell as a unit cell.

Furthermore, the present specification provides a secondary battery including a cathode, an anode, and the electrolyte membrane disposed between the cathode and the anode.

Further, the present specification provides a battery module including the secondary battery as a unit cell.

In addition, the present specification provides a method for manufacturing an electrolyte membrane which includes a lanthanum-gallium-based composite metal oxide, and has a color region of $0.39 \leq x \leq 0.40$ and $0.35 \leq y \leq 0.36$ based on the CIE x, y chromaticity distribution table.

Advantageous Effects

Composite metal oxide particles included in an electrolyte membrane according to the present specification have an advantage in that the composite metal oxide particles have small particle diameters and a uniform particle diameter distribution.

Since the composite metal oxide particles included in the electrolyte membrane according to the present specification have small particle diameters and a uniform particle diameter distribution, a dense membrane may be manufactured by using the composite metal oxide particles.

In an exemplary embodiment of the present specification, when a membrane is coated with a composition including perovskite-type particles and crystalline secondary particles and then sintered, the crystalline secondary particles among composite metal oxide particles are modified into perovskite-type particles during the sintering process, and as a result, the manufactured membrane may be a membrane formed of single perovskite-type particles.

BRIEF DESCRIPTION OF DRAWINGS

FIG. 1 is a view illustrating the CIE x, y chromaticity distribution table of an electrolyte membrane according to an exemplary embodiment of the present specification.

FIG. 2 is a schematic view illustrating the electricity generation principle of a solid oxide fuel cell (SOFC).

FIG. 3 is an X-ray diffraction analysis graph of an Example and a Comparative Example.

FIG. 4 is a measurement graph of the reflectances of the Example and the Comparative Example measured together with a white reference material.

FIG. 5 is an ion conductivity graph of the Example and the Comparative Example over the temperature.

BEST MODE

Hereinafter, the present specification will be described in detail.

The present specification provides an electrolyte membrane which includes a lanthanum-gallium-based composite metal oxide, and has a color region of $0.39 \leq x \leq 0.40$ and $0.35 \leq y \leq 0.36$ based on the CIE (Commission Internationale de l'Eclairage) x, y chromaticity distribution table.

The CIE x, y chromaticity distribution table is a distribution view illustrating all the visible rays in 2 dimensions by dividing the visible rays into two factors of brightness and chromaticity. In the CIE x, y chromaticity distribution table, a position of a specific color is represented by the coordinates of x and y.

FIG. 1 is a view illustrating the CIE x, y chromaticity distribution table of an electrolyte membrane including a lanthanum-gallium-based composite metal oxide according to an exemplary embodiment of the present specification, and when the explanation is made with reference to FIG. 1, the electrolyte membrane may have a color positioned within a square region A defined by the points of P1 (0.39, 0.35), P2 (0.39, 0.36), P3 (0.4, 0.35), and P4 (0.4, 0.36) in the CIE x, y chromaticity distribution table.

The lanthanum-gallium-based composite metal oxide is a LaGaO₃-based compound, and the LaGaO₃-based compound includes a compound having an oxygen vacancy because a portion of at least one of trivalent lanthanum (La) and gallium (Ga) is substituted with a material having a different valence. Specifically, at least one of trivalent lanthanum and gallium in LaGaO₃ may be substituted with at least one metal of a monovalent metal, a divalent metal, and a tetravalent metal, and in this case, since lanthanum or gallium is not substituted when the difference between the atom radii is large, it is preferred that the metal which substitutes lanthanum or gallium has an atomic radius which is 90% or more and 110% or less of an atomic radius of lanthanum or gallium.

The lanthanum-gallium-based composite metal oxide may be represented by the following Chemical Formula 1.

  [Chemical Formula 1]

$La_{1-x}Q_xGa_{1-y}Z_yO_{3-\delta}$

In Chemical Formula 1, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

In Chemical Formula 1, Q may be at least one of strontium (Sr), calcium (Ca), potassium (K), barium (Ba), cerium (Ce), praseodymium (Pr), and neodymium (Nd).

In Chemical Formula 1, Z may be at least one of magnesium (Mg), lithium (Li), titanium (Ti), vanadium (V), chromium (Cr), manganese (Mn), cobalt (Co), nickel (Ni), zinc (Zn), and germanium (Ge).

In Chemical Formula 1, Q may be strontium.

In Chemical Formula 1, Z may be magnesium.

In Chemical Formula 1, Q may be strontium and Z may be magnesium.

The lanthanum-gallium-based composite metal oxide may be a perovskite-type particle. The perovskite-type oxide particle means a metal oxide particle with a cubic crystal structure, which exhibits not only properties of a non-conductor, a semi-conductor, and a conductor, but also a superconducting phenomenon.

The electrolyte membrane may have a color region of $0.39 \le x \le 0.40$ and $0.35 \le y \le 0.36$ based on the CIE x, y chromaticity distribution table.

The color of the electrolyte membrane having a color region of $0.39 \le x \le 0.40$ and $0.35 \le y \le 0.36$ based on the CIE x, y chromaticity distribution table may be a brown or brown-based color. The brown color refers to an orange color displaying a blackish orange color, that is, a color between orange and black.

The present specification provides a fuel cell including an air electrode, a fuel electrode, and the electrolyte membrane disposed between the air electrode and the fuel electrode.

FIG. 2 schematically illustrates the electricity generation principle of a solid oxide fuel cell, and the solid oxide fuel cell is composed of an electrolyte membrane (electrolyte) and a fuel electrode (anode) and an air electrode (cathode) formed on both surfaces of the electrolyte membrane. Referring to FIG. 2 illustrating the electricity generation principle of the solid oxide fuel cell, oxygen ions are produced while the air is electrochemically reduced at the air electrode, and the produced oxygen ions are transferred to the fuel electrode through the electrolyte membrane. A fuel such as hydrogen, methanol, and butane is injected into the fuel electrode, and the fuel is bonded to the oxygen ions to emit electrons while being electrochemically oxidized, thereby producing water. Electrons move to an external circuit by the reaction.

The fuel electrode is an electrode in which the oxidation reaction of the fuel occurs, and may include a catalyst for an oxidation reaction of a fuel. The catalyst may use typical materials known in the art. For example, the catalyst layer may be selected from the group consisting of platinum, ruthenium, osmium, a platinum-ruthenium alloy, a platinum-osmium alloy, a platinum-palladium alloy, and a platinum-transition metal alloy.

The air electrode is a site where a reduction reaction of an oxidizing agent occurs, and may include a catalyst for a reduction reaction of an oxidizing agent. The catalyst may use typical materials known in the art. For example, platinum or a platinum-transition metal alloy may be used as a catalyst.

The catalysts of the fuel electrode and the air electrode may be not only used as they are, but also used by being supported on a carbon-based carrier.

As the carbon-based carrier, any one selected from the group consisting of graphite, carbon black, acetylene black, Denka black, Ketjen black, activated carbon, mesoporous carbon, carbon nanotube, carbon nano fiber, carbon nano horn, carbon nano ring, carbon nano wire, fullerene (C60), and Super P black, or a mixture of two or more thereof may be used.

The present specification provides a secondary battery including a cathode, an anode, and the electrolyte membrane disposed between the cathode and the anode.

The cathode is an electrode where when a battery is discharged, cations are transferred from an anode and a reduction reaction occurs, and the cathode may include a cathode active material. The cathode active material may adopt those generally used in the art, and when the cathode is an air electrode, the cathode active material may be oxygen.

The cathode may be manufactured by using a cathode active material and selectively a cathode slurry including one or two or more of a conductive material, a binder for proficiently attaching the cathode to a current collector, and a solvent.

The conductive material is not particularly limited as long as the conductive material has electric conductivity without causing a chemical change in a battery, but for example, a carbon material, an electric conductive polymer, a conductive fiber or a metal powder may be used either alone or in a mixture thereof.

The binder and the solvent may adopt those generally used in the art.

The anode includes a metal capable of emitting electrons when a battery is discharged, and may include at least one of a metal, a composite metal oxide, a metal oxide, and a composite metal oxide as an anode active material.

The anode may be manufactured by using an anode active material and selectively an anode slurry including one or two or more of a conductive material, a binder for proficiently attaching the anode to a current collector, and a solvent.

The conductive material is not particularly limited as long as the conductive material has electric conductivity without causing a chemical change in a battery, but for example, a carbon material, an electric conductive polymer, a conductive fiber or a metal powder may be used either alone or in a mixture thereof.

The binder and the solvent may adopt those generally used in the art.

The type of secondary battery may be determined depending on the type of metal included in the anode, and for example, when the anode includes a lithium metal, the secondary battery may be a lithium secondary battery, and when the anode includes a zinc metal, the secondary battery may be a zinc secondary battery, and when the anode includes an aluminum metal, the secondary battery may be an aluminum secondary battery.

The cathode and the anode may further include a cathode current collector and an anode current collector, respectively. The cathode current collector and the anode current collector collect current of the cathode and the anode, respectively, and any material may be used as long as the current collectors are a material having electric conductivity, and for example, it is possible to use one or two or more selected from the group consisting of carbon, stainless steel, nickel, aluminum, iron, and titanium. As a shape of the current collector, various shapes such as a film, a sheet, foil, a net, a porous body, a foam body, or a non-woven body may be each adopted.

The present specification provides a battery module including the fuel cell as a unit cell.

The battery module may include: a stack which includes a unit cell including the fuel cell, and a separator disposed between the unit cells; a fuel supply part which supplies fuel to the stack; and an oxidizing agent supply part which supplies an oxidizing agent to the stack.

The present specification provides a battery module including the secondary battery as a unit cell.

The battery module may be formed by stacking the batteries by a bipolar plate disposed between two or more secondary batteries according to one exemplary embodiment of the present specification.

When the secondary battery is a metal air secondary battery, the bipolar plate may be porous, such that the air supplied from the outside may be supplied to a cathode included in each of the metal air secondary batteries. For example, the bipolar plate may include a porous stainless steel or a porous ceramic.

The battery module may be specifically used as a power source for an electric vehicle, a hybrid electric vehicle, a plug-in hybrid electric vehicle, or a power storage device.

The present specification provides a method for manufacturing an electrolyte membrane which includes a lanthanum-gallium-based composite metal oxide, and has a color region of $0.39 \leq x \leq 0.40$ and $0.35 \leq y \leq 0.36$ based on the CIE x, y chromaticity distribution table.

In the method for manufacturing an electrolyte membrane, the description on the CIE x, y chromaticity distribution table, the lanthanum-gallium-based composite metal oxide, the electrolyte membrane, and the like may cite those described above.

A forming of the electrolyte membrane may include: preparing a mixture including a precursor of a lanthanum-gallium-based composite metal oxide; warming the mixture to a temperature less than 1,000° C.; synthesizing the precursor in the mixture into lanthanum-gallium-based composite metal oxide particles; and forming the electrolyte membrane by using a slurry including the lanthanum-gallium-based composite metal oxide particles.

In the warming of the mixture, the final temperature for the warming may be less than 1,000° C. In this case, since the composite metal oxide particles are synthesized at a relatively low temperature, there are advantages in that the manufacturing costs may be reduced, a process of splitting particles by a ball mill, and the like to make particles small may be omitted because particles having small particle diameters and a uniform particle diameter distribution are manufactured, or a target particle diameter may be easily made.

The lower the temperature at which composite metal oxide particles are synthesized is, the smaller the particle diameter of the composite metal oxide particles to be manufactured may be.

The composite metal oxide particles manufactured at a low temperature may include perovskite-type particles and a secondary phase of the perovskite-type particles. In other words, the presence of the secondary phase of perovskite-type particles in the manufactured composite metal oxide particles may mean that the composite metal oxide particles are manufactured at a low temperature. Here, the secondary phase of the perovskite-type particles means a crystal phase of the composite metal oxide before being synthesized as a perovskite-type structure.

The lower the temperature at which composite metal oxide particles are synthesized is, the higher the content of the secondary phase of the perovskite-type particles included in the composite metal oxide particles to be manufactured may be.

In the warming of the mixture, the final temperature for the warming may be 500° C. or more and less than 1,000° C., specifically, 500° C. or more and 950° C. or less, and 800° C. or more and 950° C. or less, if necessary.

The content of the particles which are a secondary phase may be 5 wt % or more and 30 wt % or less, specifically, 10 wt % or more and 20 wt % or less based on the total weight of the composite metal oxide particles.

The precursor of the lanthanum-gallium composite metal oxide may include: any one of oxide of lanthanum, oxynitride of lanthanum, and sulfur oxide of lanthanum; any one of oxide of gallium, oxynitride of gallium, and sulfur oxide of gallium; any one of oxide of at least one metal of strontium (Sr), calcium (Ca), potassium (K), barium (Ba), cerium (Ce), praseodymium (Pr), and neodymium (Nd), oxynitride of the metal, and sulfur oxide of the metal; and any one of oxide of at least one metal of magnesium (Mg), lithium (Li), titanium (Ti), vanadium (V), chromium (Cr), manganese (Mn), cobalt (Co), nickel (Ni), zinc (Zn), and germanium (Ge), oxynitride of the metal, and sulfur oxide of the metal.

The precursor of the lanthanum-gallium composite metal oxide may include: any one of oxide of lanthanum, oxynitride of lanthanum, and sulfur oxide of lanthanum; any one of oxide of gallium, oxynitride of gallium, and sulfur oxide of gallium; any one of oxide of strontium, oxynitride of strontium, and sulfur oxide of strontium; and oxide of magnesium, oxynitride of magnesium, and sulfur oxide of magnesium.

A method for forming an electrolyte membrane by using the slurry may adopt a method generally used in the art, and is not particularly limited.

Mode for Invention

Hereinafter, the present specification will be described in more detail through Examples. However, the following Examples are provided only for exemplifying the present specification, but are not intended to limit the present specification.

EXAMPLES

For the LSGM perovskite phase, a glycine combustion method was used in order to form an LSGM single phase at a low temperature by synthesizing small particles via a combustion reaction. As starting raw materials, La$(NO_3)_3*6H_2O$, Ga$(NO_3)_3*9H_2O$, Sr$(NO_3)_2$, and Mg$(NO_3)_2*6H_2O$ (Aldrich Chemical Co., U.S.A, 99.9%) at a predetermined molar ratio were weighed and dissolved in distilled water to prepare an aqueous solution. Further, $C_2H_5NO_2$ (Aldrich Chemical Co.) was dissolved in distilled water to prepare an aqueous citric acid solution, and then the aqueous citric acid solution was mixed with the aforementioned aqueous metal salt solution while being stirred at normal temperature for 30 minutes. In this case, the molar ratio of the metal salt to glycine was fixed to 1:1.8 based on the stoichiometry. During the stirring process of the two aqueous solutions, an aqueous nitric acid solution ($HNO_3$—Junsei Chemical Co., Japan) as an oxidizing agent was added thereto.

After evaporating moisture while stirring the manufactured aqueous solution at 300° C., the viscosity was increased, and then the aqueous solution was slowly dried while being stirring at 90° C. At the time point when the viscosity of the gel was high as a result of evaporating all the moisture, a heating mantle was heated to 500° C. to induce a combustion reaction. After heating, the resulting products were put into a heating furnace, and were each heat-treated at 800° C. to manufacture composite metal oxide particles.

The particles were placed in a carbide mold having a diameter of 20 mm, and pressurized at 2 ton to manufacture an electrolyte membrane in the form of a pellet. The electrolyte membrane was warmed to 1,500° C. at 5° C./min, and then the temperature was maintained for 3 hours to sinter the electrolyte.

Since a color of a material exhibits a white color as the size of the particles thereof becomes small, it is difficult to discern the intrinsic color of the material by the unaided eye. Accordingly, the colors of materials need to be classified through the color coordinate.

Since the composite metal oxide particles manufactured in the Example are primary particles which are synthesized at a low temperature and thus are small and uniform, the particles were obtained in the form of a powder exhibiting a white color by the unaided eye, and when the electrolyte membrane was manufactured by using the synthesized composite metal oxide particles, and a color coordinate for the manufactured electrolyte membrane was measured, it could be confirmed that the electrolyte membrane had a color region of 0.39≤x≤0.40 and 0.35≤y≤0.36 based on the CIE (Commission Internationale de l'Eclairage) x, y chromaticity distribution table.

Experimental Example 1

X-Ray Diffraction Analysis of Electrolyte Membrane

The 2θ was measured from 20° to 60° by using a D4 Endeavor apparatus manufactured by Bruker Corp., and was shown.

The electrolyte membrane in the Example was subjected to X-ray diffraction analysis by using an electrolyte membrane manufactured in the same manner as in the Example as a Comparative Example by using a lanthanum strontium gallium magnesium oxide (LSGM) manufactured by FCM, and the results are illustrated in FIG. 3.

Experimental Example 2

CIE x, y Chromaticity Distribution Table

A color coordinate was measured in a reflective mode by using a chromaticity luminance meter (Chroma Meter CL-200A, Konica Minolta).

The color coordinate measurement results for the Example and the Comparative Example (LSGM manufactured by FCM) are shown in the following Table 1.

TABLE 1

| Classification | X | Y | Z | x | y |
|---|---|---|---|---|---|
| White reference material | 7298407 | 7298282 | 7296645 | 0.3334 | 0.3334 |
| Example | 1493720 | 1339067 | 831782 | 0.4076 | 0.3654 |
| Comparative Example | 509717 | 501249 | 540578 | 0.3285 | 0.3231 |

Experimental Example 3

Measurement of Reflectance

The graph of measuring the reflectances of the Example and the Comparative Example (LSGM manufactured by FCM) together with the white reference material is illustrated in FIG. 4.

Experimental Example 4

Ion Conductivity

The ion conductivity was measured by using an impedance measurement apparatus manufactured by Solartron Metrology. In order to measure the ion conductivity, a 2 electrode 4 probe method using a disc pellet was used. For the EIS experimental conditions, the ion conductivity was calculated through a Nyquist plot exhibiting a real number value and an imaginary impedance value as a graph by sweeping a frequency region of $10^{-4}$ to $10^2$ to read each impedance value.

The disc pellet was manufactured by preparing a disc-type electrolyte pellet, sintering the electrolyte pellet at an electrolyte sintering temperature, printing a Pt electrode at both sides of the pellet, and sintering the electrolyte pellet again.

An ion conductivity graph depending on the temperature of the Example and the Comparative Example (LSGM manufactured by FCM) is illustrated in FIG. 5.

The invention claimed is:

1. An electrolyte membrane which comprises a lanthanum-gallium-based composite metal oxide, and has a color region of 0.39≤x≤0.40 and 0.35≤y≤0.36 based on the CIE (Commission Internationale de l'Eclairage) x, y chromaticity distribution table,
    wherein the electrolyte membrane manufactured by a method comprising:
    preparing a mixture comprising a precursor of a lanthanum-gallium-based composite metal oxide comprising evaporating moisture and heating to induce a combustion reaction;

warming the mixture to a temperature of 800° C. or more and less than 950° C., thereby synthesizing the precursor in the mixture into lanthanum-gallium-based composite metal oxide particles; and forming the electrolyte membrane by using a slurry comprising the lanthanum-gallium-based composite metal oxide particles, the synthesized composite metal oxide particles comprise lanthanum-gallium-based composite metal oxide particles which are represented by the following Chemical Formula 1, and secondary phase particles, a content of the secondary phase particles is 5 wt % or more and 30 wt % or less based on the total weight of the synthesized composite metal oxide particles, wherein the lanthanum-gallium-based composite metal oxide of the electrolyte membrane is represented by the following Chemical Formula 1:

$La_{1-x}Q_xGa_{1-y}Z_yO_{3-\delta}$  [Chemical Formula 1]

in Chemical Formula 1,

Q is strontium, Z is magnesium, and $0<x<0.25$, $0<y<0.25$, and $0<\delta<0.5$.

2. The electrolyte membrane of claim 1, wherein the electrolyte membrane has a brown color.

3. The electrolyte membrane of claim 1, wherein the lanthanum-gallium-based composite metal oxide is a perovskite-type particle.

4. A fuel cell comprising:
an air electrode;
a fuel electrode; and
the electrolyte membrane of claim 1 disposed between the air electrode and the fuel electrode.

5. A battery module comprising the fuel cell of claim 4 as a unit cell.

6. A secondary battery comprising:
a cathode;
an anode; and
the electrolyte membrane of claim 1 disposed between the cathode and the anode.

7. A battery module comprising the secondary battery of claim 6 as a unit cell.

8. A method for manufacturing an electrolyte membrane which comprises a lanthanum-gallium-based composite metal oxide, and has a color region of $0.39 \leq x \leq 0.40$ and $0.35 \leq y \leq 0.36$ based on the CIE x, y chromaticity distribution table, wherein a forming of the electrolyte membrane comprises:

preparing a mixture comprising a precursor of a lanthanum-gallium-based composite metal oxide;

warming the mixture to a temperature less than 1,000° C.;

synthesizing the precursor in the mixture into lanthanum-gallium-based composite metal oxide particles; and forming the electrolyte membrane by using a slurry comprising the lanthanum-gallium-based composite metal oxide particles, the synthesized composite metal oxide particles comprise lanthanum-gallium-based composite metal oxide particles which are represented by the following Chemical Formula 1, and secondary phase particles, a content of the secondary phase particles is 5 wt % or more and 30 wt % or less based on the total weight of the synthesized composite metal oxide particles, wherein the lanthanum-gallium-based composite metal oxide of the electrolyte membrane is represented by the following Chemical Formula 1:

$La_{1-x}Q_xGa_{1-y}Z_yO_{3-\delta}$  [Chemical Formula 1]

in Chemical Formula 1,

Q is strontium, Z is magnesium, and $0<x<0.25$, $0<y<0.25$, and $0<\delta<0.5$.

9. The method of claim 8, wherein the precursor of the lanthanum-gallium-based composite metal oxide comprises:

any one of oxide of lanthanum, oxynitride of lanthanum, and sulfur oxide of lanthanum;

any one of oxide of gallium, oxynitride of gallium, and sulfur oxide of gallium;

any one of oxide of strontium, oxynitride of strontium, and sulfur oxide of strontium; and any one of oxide of magnesium, oxynitride of magnesium, and sulfur oxide of magnesium.

10. The electrolyte membrane of claim 1, wherein the content of the secondary phase particles is 10 wt % or more and 30 wt % or less based on the total weight of the synthesized composite metal oxide particles.

* * * * *